United States Patent

McClain

Patent Number: 6,014,676
Date of Patent: Jan. 11, 2000

[54] SYSTEM AND METHOD FOR BACKING UP COMPUTER FILES OVER A WIDE AREA COMPUTER NETWORK

[75] Inventor: Fred W. McClain, Del Mar, Calif.

[73] Assignee: Fairbanks Systems Group, San Diego, Calif.

[21] Appl. No.: 09/080,171

[22] Filed: May 16, 1998

Related U.S. Application Data

[63] Continuation of application No. 08/757,134, Dec. 3, 1996.
[51] Int. Cl.[7] ................................................. G06F 17/00
[52] U.S. Cl. ........................ 707/204; 707/202; 707/10; 711/162; 711/111; 395/182.04; 395/204
[58] Field of Search ................................. 707/204, 201, 707/202, 203, 205, 100, 104; 711/111, 162; 395/182.04

[56] References Cited

U.S. PATENT DOCUMENTS

| | | | |
|---|---|---|---|
| 3,711,863 | 1/1973 | Bloom | 444/1 |
| 3,715,734 | 2/1973 | Fajans | 340/173 |
| 4,361,832 | 11/1982 | Cole | 340/505 |
| 4,377,000 | 3/1983 | Staab | 371/11 |
| 4,491,934 | 1/1985 | Heinz | 364/900 |
| 4,558,302 | 12/1985 | Welch | 340/347 |
| 4,616,315 | 10/1986 | Logsdon et al. | 364/200 |
| 4,641,274 | 2/1987 | Swank | 364/900 |
| 4,654,819 | 3/1987 | Stiffler et al. | 364/900 |
| 4,686,620 | 8/1987 | Ng | 364/200 |
| 4,727,509 | 2/1988 | Johnson et al. | 364/900 |
| 4,792,896 | 12/1988 | Maclean et al. | 364/200 |
| 4,807,182 | 2/1989 | Queen | 364/900 |
| 4,819,154 | 4/1989 | Stiffler et al. | 364/200 |
| 4,881,075 | 11/1989 | Weng | 341/87 |
| 4,893,307 | 1/1990 | McKay et al. | 370/94.1 |
| 4,910,666 | 3/1990 | Nibby, Jr. et al. | 364/200 |
| 4,914,576 | 4/1990 | Zelley et al. | 364/200 |

(List continued on next page.)

FOREIGN PATENT DOCUMENTS

| | | |
|---|---|---|
| 0541281A2 | 5/1993 | European Pat. Off. . |
| WO 94/17474 | 8/1994 | WIPO . |

OTHER PUBLICATIONS

Brochure: 3Com Corp. 3165 Kifer Road, Santa Clara, CA 95052. 3+ Network Software Family. 29 pages. Sep. 1991.

Brochure: Emerald Systems. 12230 World Trade Drive, San Diego, CA 92128. NetWare 3.11 Compatible product line and price list 18 pages. Jun. 1991.

Article: "Distributed Network Processing Speeds Up Network Backup." Masters. 8211 Computer Technology Review. vol. 10, pp. 55–56–58–60. Aug. 1992.

Article: "Exploiting Symmetries For Low–Cost Comparison of File Copies." Barbara et al. The 8th International Conference on Distributed Computing Systems. The Computer Society. IEEE CH2541–1/88. pp. 471–479. Jun. 13, 1988.

Primary Examiner—Thuy Pardo
Attorney, Agent, or Firm—John L. Rogitz

[57] ABSTRACT

A system backs up computer files to a remote site via modem. Files of a user computer that are found in a common library at the remote site initially are not copied to the remote site, whereas files not in the library are copied to the remote site. Then, periodically the user computer determines which blocks have been changed, and the user computer transmits only changed blocks to the remote site. The blocks are gathered in "chunk" files, and when a chunk file reaches a predetermined size, it is transmitted to the remote site for updating the back up version of the respective file. The process then resumes identifying changed blocks. In addition to flagging the changed block for transfer, the process resynchronizes the local data file with the backed up version using a two-step comparison, first comparing the first two characters in the block with a pre-stored character set, and then, if the first comparison results in a match, comparing a digital signature of the changed block with a pre-stored signature. If either comparison results in a mismatch, the test is repeated using, as the first byte of the test block, the next byte in the sequence.

3 Claims, 3 Drawing Sheets

U.S. PATENT DOCUMENTS

| | | | |
|---|---|---|---|
| 5,008,936 | 4/1991 | Hamilton et al. | 380/50 |
| 5,043,871 | 8/1991 | Nishigaki et al. | 364/200 |
| 5,051,947 | 9/1991 | Messenger et al. | 364/900 |
| 5,060,185 | 10/1991 | Naito et al. | 364/900 |
| 5,133,065 | 7/1992 | Cheffetz et al. | 395/575 |
| 5,155,845 | 10/1992 | Beal et al. | 395/575 |
| 5,163,148 | 11/1992 | Walls | 707/204 |
| 5,193,154 | 3/1993 | Kitajima et al. | 395/250 |
| 5,202,982 | 4/1993 | Gramlich et al. | 395/600 |
| 5,210,866 | 5/1993 | Milligan et al. | 395/575 |
| 5,212,772 | 5/1993 | Masters | 395/200 |
| 5,212,784 | 5/1993 | Sparks | 395/575 |
| 5,235,601 | 8/1993 | Stallmo et al. | 371/40.1 |
| 5,239,637 | 8/1993 | Davis et al. | 395/425 |
| 5,239,647 | 8/1993 | Anglin et al. | 395/600 |
| 5,239,659 | 8/1993 | Rudeseal et al. | 395/800 |
| 5,241,668 | 8/1993 | Eastridge et al. | 395/575 |
| 5,263,154 | 11/1993 | Eastridge et al. | 395/575 |
| 5,274,802 | 12/1993 | Altine | 395/600 |
| 5,276,860 | 1/1994 | Fortier et al. | 395/575 |
| 5,276,865 | 1/1994 | Thorpe | 395/575 |
| 5,278,838 | 1/1994 | Ng et al. | 371/10.1 |
| 5,293,613 | 3/1994 | Hayden et al. | 395/575 |
| 5,295,258 | 3/1994 | Jewett et al. | 395/575 |
| 5,321,832 | 6/1994 | Tanaka et al. | 707/204 |
| 5,347,653 | 9/1994 | Flynn et al. | 395/600 |
| 5,357,607 | 10/1994 | Sathi et al. | 395/166 |
| 5,367,698 | 11/1994 | Webber et al. | 395/800 |
| 5,375,232 | 12/1994 | Legvold et al. | 395/575 |
| 5,404,508 | 4/1995 | Konrad et al. | 395/600 |
| 5,416,840 | 5/1995 | Cane et al. | 380/4 |
| 5,435,004 | 7/1995 | Cox et al. | 395/575 |
| 5,446,871 | 8/1995 | Shomler et al. | 395/180 |
| 5,448,718 | 9/1995 | Cohn et al. | 395/404 |
| 5,454,099 | 9/1995 | Myers et al. | 395/575 |
| 5,475,834 | 12/1995 | Anglin et al. | 395/600 |
| 5,479,654 | 12/1995 | Squibb | 395/600 |
| 5,495,533 | 2/1996 | Linehan et al. | 380/21 |
| 5,497,483 | 3/1996 | Beardsley et al. | 395/575 |
| 5,506,986 | 4/1996 | Healy | 711/111 |
| 5,513,314 | 4/1996 | Kandasamy et al. | 395/182.04 |
| 5,513,351 | 4/1996 | Grantz | 395/600 |
| 5,515,502 | 5/1996 | Wood | 395/182.13 |
| 5,546,534 | 8/1996 | Malcom | 395/182.04 |
| 5,548,750 | 8/1996 | Larsson et al. | 395/600 |
| 5,559,991 | 9/1996 | Kanfi | 711/162 |
| 5,564,037 | 10/1996 | Lam | 395/488 |
| 5,566,331 | 10/1996 | Irwin, Jr. et al. | 395/600 |
| 5,574,906 | 11/1996 | Morris | 395/601 |
| 5,584,023 | 12/1996 | Hsu | 707/204 |
| 5,586,322 | 12/1996 | Beck et al. | 395/616 |
| 5,594,900 | 1/1997 | Cohn et al. | 395/600 |
| 5,596,706 | 1/1997 | Shimazaki et al. | 395/182.04 |
| 5,604,862 | 2/1997 | Midgely et al. | 395/182.04 |
| 5,606,693 | 2/1997 | Nilsen et al. | 395/610 |
| 5,615,364 | 3/1997 | Marks | 395/618 |
| 5,623,662 | 4/1997 | McIntosh | 707/204 |
| 5,640,561 | 6/1997 | Satoh et al. | 395/618 |
| 5,649,089 | 7/1997 | Kilner | 395/128.04 |
| 5,649,196 | 7/1997 | Woodhill et al. | 395/620 |
| 5,659,614 | 8/1997 | Bailey, III | 380/4 |
| 5,659,743 | 8/1997 | Adams et al. | 395/621 |
| 5,664,186 | 9/1997 | Bennett et al. | 395/620 |
| 5,668,986 | 9/1997 | Nilsen et al. | 395/610 |
| 5,668,991 | 9/1997 | Dunn et al. | 395/618 |
| 5,671,350 | 9/1997 | Wood | 395/182.13 |
| 5,673,381 | 9/1997 | Huai et al. | 395/180 |
| 5,675,725 | 10/1997 | Malcolm | 395/182.04 |
| 5,708,820 | 1/1998 | Park et al. | 395/750 |
| 5,713,024 | 1/1998 | Halladay | 395/712 |
| 5,724,807 | 3/1998 | Hoshen et al. | 395/650 |
| 5,765,173 | 6/1998 | Cane et al. | 707/204 |

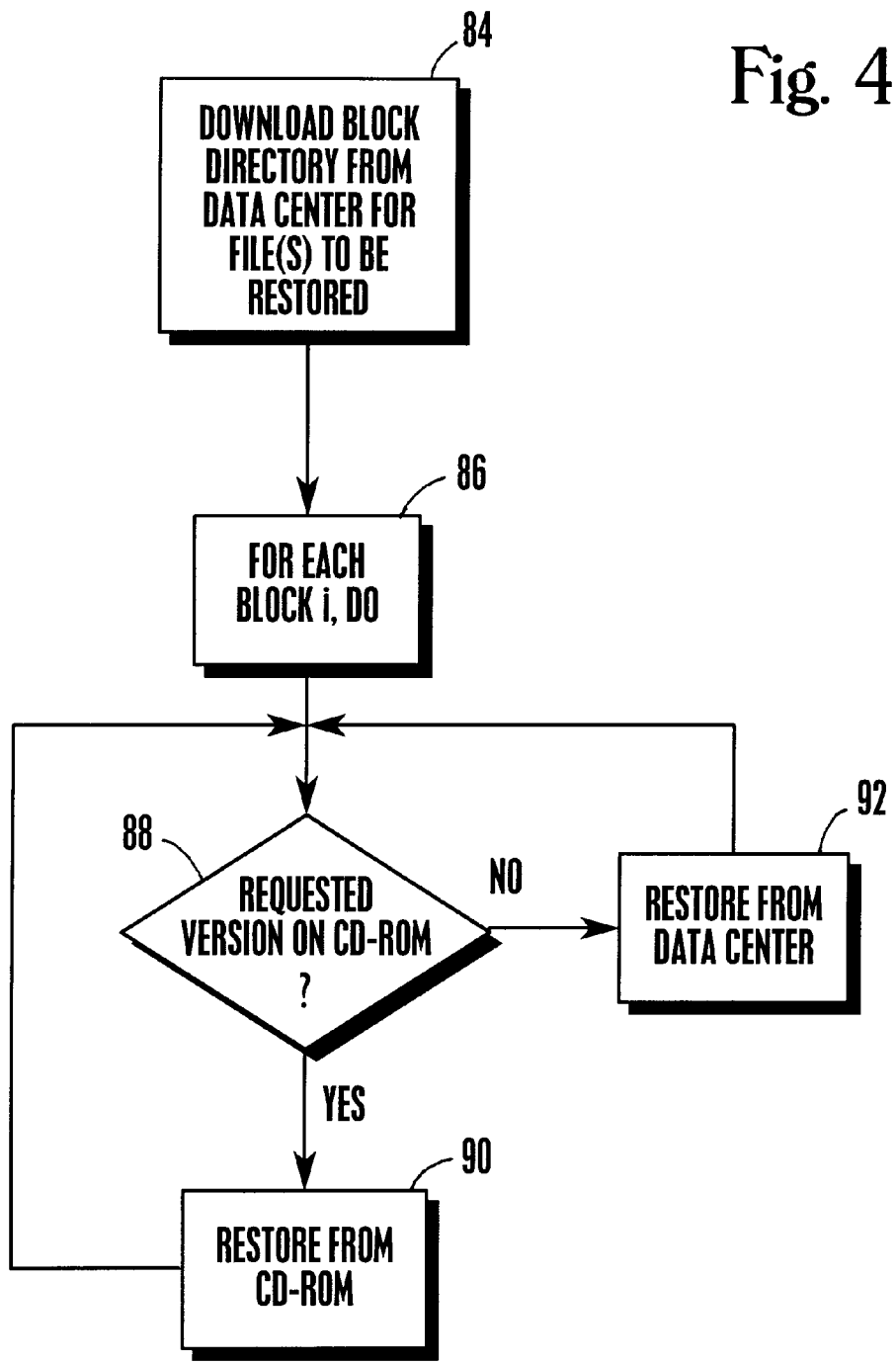

SYSTEM AND METHOD FOR BACKING UP COMPUTER FILES OVER A WIDE AREA COMPUTER NETWORK

This application is a continuation application of prior co-pending U.S. patent application Ser. No. 08/757,134, filed Dec. 3, 1996 entitled "System and Method for Backing Up Computer Files Over A Wide Area Computer Network".

FIELD OF THE INVENTION

The present invention relates generally to computer file back up systems, and more particularly to automated computer file back up systems.

BACKGROUND

Extraordinarily large amounts of information are stored on electronic media, such as personal computer hard disk drives and other well-known data storage media. Increasingly, the information is exclusively stored on such media; no "hard" (i.e., paper) copies exist for much information. It can readily be appreciated that such so-called "paperless" information storage systems consume less space and virtually no natural resources, in contrast to systems that require information to be stored on paper. Unfortunately, it is not uncommon for electronic data storage media to "crash", i.e., to become damaged or otherwise lose its information. Such information loss can be devastating to the information owner and highly costly.

Accordingly, many computer system managers routinely make back up copies of computer files. Typically, once each day (or at some other specified periodicity) a system manager will cause the computer system to copy files that are resident on the hard disk drives of the system onto storage media such as other hard disk drives or magnetic tape. Should a file or entire hard disk drive in the system be damaged, lost, or otherwise rendered inaccessible, the back up copy of the file that is stored on, e.g., the storage tape can be copied back into the system.

Such back up systems suffer from several drawbacks. First, they usually require user interaction to initiate the back up process, and consequently occupy the time of a person who must undertake the tedious chore. Further, systems which back up computer files and store the files in the same premises as the system being backed up are of little value in the event of a catastrophe such as a fire or flood. This is because the backed up file copies can be expected to perish along with the files that are resident in the system, thereby rendering the back up system a failure.

An example of an alternate back up system is disclosed in U.S. Pat. No. 5,479,654, which teaches sending changed portions of computer files via modem to an off-site electronic storage facility. As taught in the '654 patent, segments of computer files are checked for changes that have been made since the previous back up. This check first consists of comparing a so-called "exclusive-OR" ("XOR") product of the file against an XOR value that was calculated previously for the stored back up version of the file. If the XORs do not agree, a file change is indicated, and the changed portion of the file is sent via modem to the off-site facility.

On the other hand, if the XORs do agree, a second, more rigorous check is made to determine whether the segment has been changed since the last back up. The second check consists of comparing a cyclic redundancy check (CRC) product of the segment against a previously recorded CRC value. If the CRCs do not match, a file change is indicated, and the changed portion of the file is sent via modem to the off-site facility. Otherwise, the segment is assumed to have not been changed since the last back up.

Unfortunately, the system disclosed in the '654 patent can require two calculations per check. Each calculation consumes computing time, and as recognized by the present invention, it is consequently desirable to minimize the number of calculations undertaken to determine whether a change has been made to a computer file. As further recognized herein, it is nevertheless desirable to undertake an initial "quick and dirty" check to reduce the number of computationally rigorous checks that must be made.

Moreover, as recognized by the present invention it is necessary to manage the transmission of data to the off-site storage facility, to avoid one user interfering with the back up operations of another user. Still further, the present invention recognizes that some files need not initially be backed up at all. And, the present invention recognizes that file restoration can be provided for in more than one way to reduce the time required to restore lost files to a computer system.

Accordingly, it is an object of the present invention to provide a system and method for backing up computer files. Another object of the present invention is to provide a system and method for backing up computer files to a remote facility via modem. Still another object of the present invention is to provide a system and method for backing up computer files by automatically sending only changed portions of the files to an off-site facility. Yet another object of the present invention is to provide a system and method for backing up computer files that is easy to use and cost-effective.

SUMMARY OF THE INVENTION

A computer program product includes a computer program storage device that is readable by a digital processing system and a program means on the program storage device. As intended by the present invention, the program device is realized in a critical machine component that causes the digital processing system to perform method steps to back up at least some blocks in at least one local computer file from at least one user computer in a computer network. In accordance with the present invention, the method steps include transmitting the local file to a data center that is remote from the user computer to render a remote version, with the data center being accessible via the computer network. For each of the blocks (i.e., each sequence of one thousand (1000) bytes) in the local file, two respective characters thereof are copied, with the characters defining a respective first comparison value. Additionally, the method steps include generating respective digital signature codes defining second comparison values.

Moreover, the method steps include, for each block, periodically determining a test digital signature code and comparing it to the respective second comparison value. A block of the local file is designated as a transmission block to be transmitted to the data center to thereby update the remote version when the test digital signature code of the block does not equal the second comparison value of the block.

In a preferred embodiment, the method steps further include determining whether the first two characters of the block, starting at a test byte$_i$, equal one of the first comparison values, wherein i=a natural number, when the test digital signature code of a block does not equal the respective second comparison value. Furthermore, the method steps include determining a block digital signature code using the test byte$_i$ as the first byte of a test block when the first two characters of the block equal one of the first comparison values, and determining whether the block digital signature code equals one of the second comparison values. When the block digital signal code equals one of the second comparison values, the method returns "resynchronized". Otherwise, when either the first two characters of the block do not equal one of the first comparison values, or when the block digital signature code does not equal one of the second comparison values, the method sets i=i+1 and repeats the steps of this paragraph.

The method steps may further include gathering transmission blocks in a transfer chunk. When the size of the transfer chunk equals a predetermined size, the transfer chunk is transmitted to the data center. Preferably, transfer chunks are transmitted to the data center only during a predetermined period. Still further, the method steps may additionally include, for each local file block, determining whether a duplicate of the local file block is stored in a common file library at the data center. The file block is copied to the data center only when a duplicate of the local file block is not stored in a common file library.

In preferred embodiments, the method steps yet further include periodically copying remote versions of file blocks at the data center onto a portable data storage medium. Local files are restored by copying remote versions of file blocks from the portable data storage medium when the remote versions that are stored on the portable data storage medium are at least as current as the remote versions stored at the data center, and otherwise they are restored by copying remote versions of the file blocks from the data center.

The computer program product is also disclosed in combination with the digital processing apparatus, and in further combination with the computer network. A computer-implemented method using the above-described steps is also disclosed.

In another aspect, a system is disclosed for backing up files in user computers. The system includes a data center including a library of common computer file blocks, and a plurality of user computers remote from the data center and in communication with the data center. Common library logic means determine, for each user computer, which if any of the file blocks of the user computer are common file blocks by virtue of being contained in the common library. Also, initialization logic means are associated with each user computer for causing file blocks except common file blocks to be transmitted to the data center. And, subfile incremental back up logic means are associated with each user computer for determining changed blocks that have been changed since a predetermined back up time. Changed block signals are generated in response thereto. Chunk transmission logic means are responsive to the subfile incremental logic means for sending only changed blocks to the data center in chunks having a predetermined size. As disclosed in further detail below, synchronizing logic means are responsive to the changed block signals for synchronizing the subfile incremental logic means.

The details of the present invention, both as to its structure and operation, can best be understood in reference to the accompanying drawings, in which like reference numerals refer to like parts, and in which:

BRIEF DESCRIPTION OF THE DRAWINGS

FIG. 4 is a flow chart of the restore process.

DETAILED DESCRIPTION OF THE PREFERRED EMBODIMENT

Figure 1:
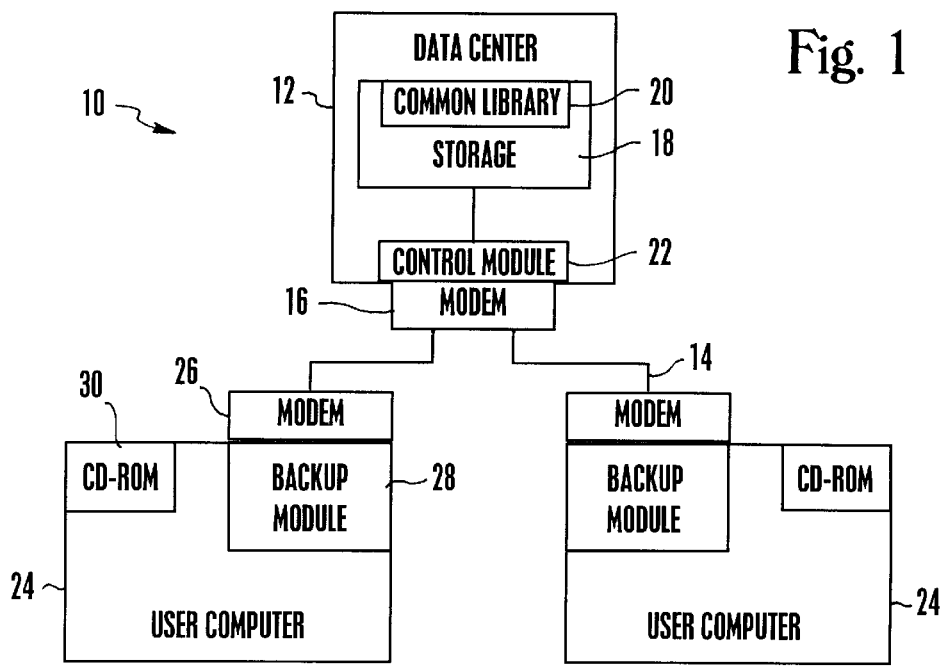
FIG. 1 is a schematic diagram of the computer file back up system of the present invention.

Referring initially to FIG. 1, a system is shown, generally designated 10, which includes a server computer, referred to herein as a data center 12, which is part of a computer network. In the preferred embodiment, the data center 12 is part of the computer network 14 referred to as the Internet, and the data center 12 can communicate with other computers on the network 14 via a modem 16.

As shown in FIG. 1, the data center 12 includes an electronic data storage repository 18 with an associated common library 20. A control module 22 controls the flow of data into and out of the repository 18 in consonance with the novel logic described below.

Per the present invention, the common library 20 stores the blocks of computer files that are widely distributed and used by many users and, hence, that are common to many users. For example, the common library 20 can store copies of well-known off-the-shelf personal computer operating systems, network browsers, and so on. As intended by the present invention, the data storage repository 18 with common library 20 can be physically implemented in a suitable medium, such as magnetic tape, hard disk arrays, compact disk read-only memory (CD-ROM), DASD arrays, or even floppy diskettes.

Plural user computers 24, e.g., personal computers or laptop computers, communicate with the network 14 via respective user modems 26 or other appropriate network connection in accordance with well-known principles. In the preferred embodiment, each user computer 24 includes a respective software-implemented back up module 28 that undertakes the inventive steps of the present invention. It is to be understood that in another embodiment, the back up modules 28 can be remote from, but accessible to, the user computers 24. Additionally, each user computer 24 preferably includes a respective CD-ROM drive 30 for purposes to be made clear shortly.

As those skilled in the art will recognize, the user computers 24 can also be associated with respective video monitors, printers, and other output devices, and keyboards, keypads, mice, and other input devices.

Figure 2:
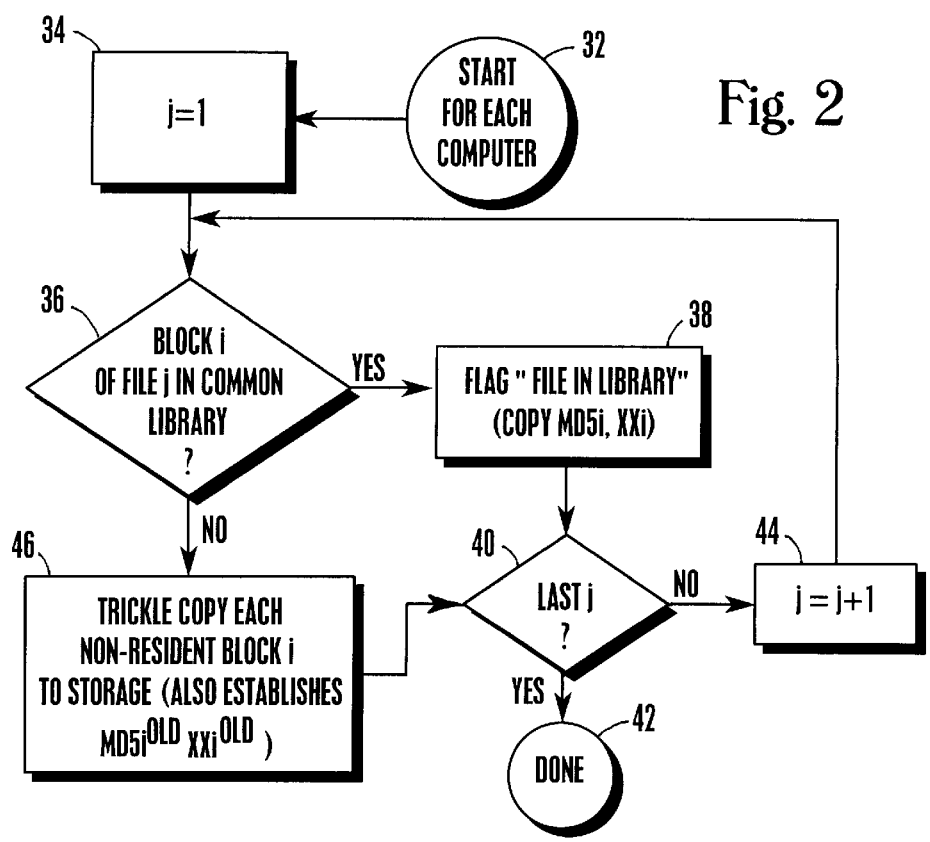
FIG. 2 is a flow chart of the initialization process.
Figure 3:
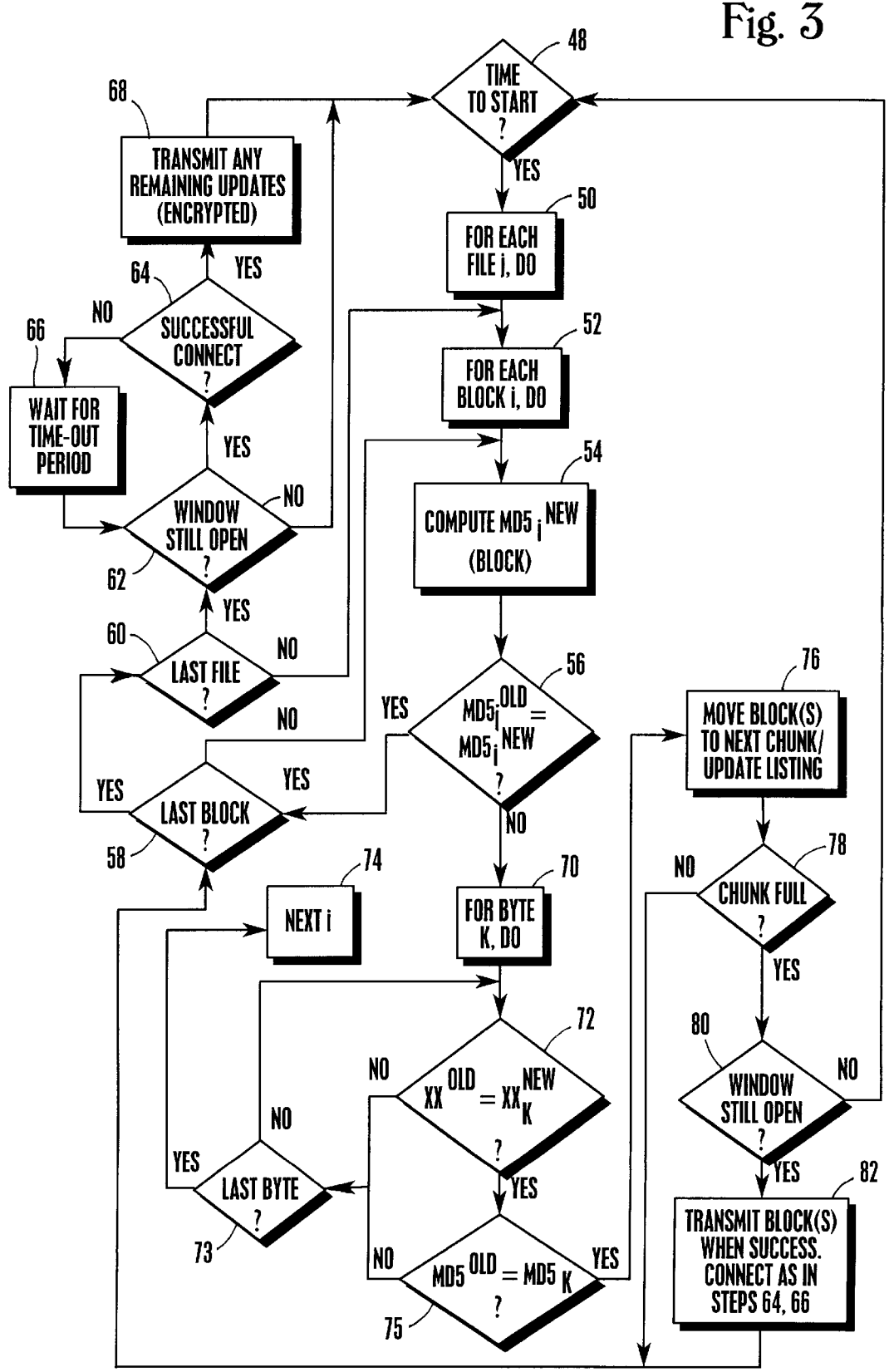
FIG. 3 is a flow chart of the subfile incremental back up process.

FIGS. 2–4 illustrate the structure of the back up module 30 of the present invention as embodied in computer program software. Those skilled in the art will appreciate that the Figures illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown in the Figures.

These instructions may reside on a program storage device including a data storage medium to establish a computer program product, such as a programmed computer diskette. Alternatively, such media can also be found in semiconductor devices, on magnetic tape, on optical disks, on a DASD array, on a conventional hard disk drive, on electronic read-only memory or on electronic random access memory, or other appropriate data storage device. In an illustrative embodiment of the invention, the logic means are computer-executable instructions that are written in C++ language code.

Referring now to FIG. 2, the initialization process can be understood. The process begins at start state 32 for each user computer 24 and moves to block 34, wherein a file index counter "j" is set equal to unity. Moving to decision diamond 36, it is determined whether a copy of the $j^{th}$ file, on a block-by-block basis using the so-called "message digest five" ("MD5") code discussed further below, is already stored in the common library 20. For the blocks that are stored in the common library, the process moves to block 38 to flag the blocks as being in the common library and, hence, not candidates for wholesale transfer to the data center 12. Thus, it is to be understood that in the event that the $j^{th}$ file as it exists in the user computer 24 has been modified from the common, off-the-shelf version in the common library 20, the modified portions will be detected and transferred to the data center 12 during the subfile incremental procedure discussed below in reference to FIG. 3.

In any case, it can now be appreciated that the use of the common library 20 avoids the necessity of transmitting via modem to the data center 12 very large, off-the-shelf computer files that are resident on many if not most personal computer systems and that would otherwise require backing up. In other words, the common library 20 reduces the time and cost of making initial copies of the files in the user computers 24.

Additionally, at block 38 a block-by-block comparison value listing is recorded that has two entries for every block$_i$ (wherein "i" is a block index counter) of every file$_j$ flagged as being in the common library 20. The first entry is the first two characters ("XX$_i$") of the first byte of each block$_i$. In contrast, the second entry is a digital signature ("MD5$_i$"), the value of which is uniquely defined by the contents of the block$_i$. The first entry establishes a first comparison value, and the second entry establishes a second comparison value.

As mentioned above, in the presently preferred embodiment, the digital signature used is the 128 bit-long "message digest five" ("MD5") code known in the cryptology art. As recognized by the present invention, the MD5 code of a block changes a great deal with even very small changes of the block. Thus, the digital signature of the present invention advantageously is more sensitive to changes in a block than are check sums, cyclic redundancy codes, and so-called "exclusive or" codes.

From block 38, the logic proceeds to decision diamond 40 to determine whether the last file in the user computer 24 has been tested. If so, the initialization process terminates at state 42. Otherwise, the process moves to block 44 to increment the file index counter "j" by one, and then to loop back to decision diamond 36.

In contrast, if it is determined at decision diamond 36 that a copy of the $i^{th}$ block of the $j^{th}$ file is not in the common library 20, the logic proceeds to block 46 to trickle copy each non-resident block$_i$ of the file$_j$ to the storage repository 18 of the data center 12. By "trickle copy" is meant that the non-resident blocks of the file are transmitted to the data center 12 during a predetermined transmission period, also referred to herein as a "window", until the entire non-resident portions file has been transmitted, or until the transmission period elapses.

If the transmission period elapses before the non-resident portion of the file has been transmitted in its entirety, the respective back up module 28 notes the value of the block index counter "i", and stops transmitting the file$_j$. Then, at the start of the next transmission period, the back up module 28 increments the block index counter "i" by unity and commences transmitting the file$_j$ where it previously had left off. As indicated in FIG. 2, the block-by-block listing of XX$_i$ and MD5$_i$ is generated at block 46 as described previously in reference to block 38. From block 46, the logic proceeds to decision diamond 40 to function as previously described.

Turning now to FIG. 3, the subfile incremental back up logic can be seen. It is to be understood that as intended by the present invention, periodically (e.g., on a daily basis) the back up module 28 of each user computer 24 will undertake the process discussed below.

Commencing at decision diamond 48, it is determined whether a user-selected predetermined back up period has commenced. When it has, the process moves to block 50 to enter a do loop for each file$_j$ that has been designated by the user to be backed up. Then, the process moves to block 52 to enter a do loop for each block$_i$ of the file$_j$ that was selected at block 50.

Moving to block 54, the back up module 28 computes the digital signal MD5$_i$$^{new}$ of the block$_i$ under test. Next, the digital signal MD5$_i$$^{new}$ of the block$_i$ under test is compared, at decision diamond 56, with the digital signal MD5$_i$$^{old}$ that is recorded in the listing that was generated in FIG. 2, as described above.

When the digital signatures are equal, indicating that no change was made to the block$_i$ under test since the last back up, the process moves to decision diamond 58. At decision diamond 58, the logic determines whether the last block of the file$_j$ has been tested, and if not, the process loops back to retrieve the next block$_i$ and compute its digital signature as shown and described. In other words, if further blocks exist for the file$_j$ under test, the index counter "i" is incremented by one, and the process loops back to block 54.

If, on the other hand, the last block of the file$_j$ has been tested, the logic determines, at decision diamond 60, whether the last file in the user computer 24 has been tested. If not, the process loops back to retrieve the next file and proceed as before to test the blocks in the file. Otherwise, the process moves to decision diamond 62.

At decision diamond 62, it is determined whether the back up period has not elapsed, i.e., whether the allocated back up window is still open. If the period has elapsed, the logic loops back to decision diamond 48 to await the commencement of the next allocated back up period. In contrast, if the back up window is still open, the logic attempts to establish communication with the data center 12 via the modems 26, 16.

At decision diamond 64, it is determined whether the communication connection was successful. If it wasn't, the logic moves to block 66 to wait a predetermined time-out period (preferably five minutes) before looping back to decision diamond 62 to retry the connection if the window is still open. In any case, when it is determined that communication has been established between the user computer 24 and the data center 12 subsequent to testing all files, in the user computer 12, the logic encrypts and compresses any remaining updated blocks (described further below) and transmits them to the data center 12, at block 68. From block 68, the process loops back to decision diamond 48.

Returning to the negative loop originating at decision diamond 56, when the digital signature of the block$_i$ does not match the signature stored in the listing for the block, a change to the block$_i$ is indicated, and the block$_i$ therefore becomes a candidate for back up. Additionally, the process resynchronizes itself with the block-by-block comparison value listing discussed above.

Accordingly, after a negative test at decision diamond 56 (i.e., when the logic essentially returns a "changed block"

signal), the logic moves to block 70, wherein a do loop is entered for the bytes$_k$ of the block$_i$. "k" is an index counter initially equal to unity. Moving to decision diamond 72, the logic determines whether the first two characters ("XX$_k^{new}$") of the block starting with the byte$_k$ under test equal the first comparison value ("XX$_i^{old}$") that corresponds to the block$_i$ in the comparison value listing. If not, the logic moves to decision diamond 73 to determine whether the current byte$_k$ is the last byte of the candidate block under test. Stated differently, at decision diamond 73 the logic determines whether the byte index counter "k" equals one thousand. If it does, the logic moves to block 74 to increment the block index counter "i" by unity, and then the logic loops back to block 70 with the byte index counter "k" reset to unity. Thus, the next thousand comparisons at decision diamond 72 accordingly will use, as the first comparison value, the first two characters of the new "$i^{th}$" block. If it is determined that the byte index counter "k" does not equal one thousand at decision diamond 73, the logic loops back to increment "k" by unity and test the next byte in the block$_i$ at decision diamond 72.

If, however, it is determined at decision diamond 72 that "XX$_k^{new}$" equals "XX$_i^{old}$", the logic proceeds to decision diamond 75. At decision diamond 75, the digital signature of the block having as its first byte the byte$_k$ under test is determined and compared to the second comparison value ("MD5$_i^{old}$") that corresponds to the block$_i$ in the comparison value listing. If not, the logic moves to decision diamond 73.

If the digital signature of the block having as its first byte the byte$_k$ under test is determined to be equal to the second comparison value ("MD5$_i^{old}$") at decision diamond 75, the logic returns "resynchronized" and moves to block 76. In other words, a positive test at decision diamond 75 indicates that the logic has found an old, unchanged block that previously has been backed up, and, hence, that the logic is resynchronized with the comparison value listing.

At block 76, the changed block(s) (also referred to herein as "transmission blocks") are moved to a "next chunk" file. Additionally, at block 76 the comparison value listing is updated to include the first two characters and digital signatures of the changed block(s), for use as the first and second comparison values, respectively, during the test of the blocks during the next back up cycle. Moving to decision diamond 78, it is determined whether the chunk file is full. In the presently preferred embodiment, the chunk file is full when its size is five megabytes (5 MB).

If the chunk file is not full, the logic returns to decision diamond 58. In contrast, if the chunk file is full, the process moves to decision diamond 80 to determine whether the back up period has not elapsed, i.e., whether the allocated back up window is still open. If the period has elapsed, the logic loops back to decision diamond 48 to await the commencement of the next allocated back up period. In contrast, if the back up window is still open, the logic transmits the chunk when a successful connection has been established with the data center 12, using the procedure of steps 64 and 66 discussed above. From block 82, the logic returns to decision diamond 58.

FIG. 4 shows the logic by which lost files may be restored to a user computer 24. It is to be understood that as envisioned herein, backed up file blocks at the data center 12 are periodically (e.g., weekly, monthly, quarterly, etc.) copied from the storage repository 18 to CD-ROM disks, and the disks then transported to the same physical location as the associated user computer 24. Hereinafter, these CD-ROM disks are referred to as "local back up disks".

At block 84, a directory of blocks in the data center 12 that correspond to the user computer 24 is downloaded from the data center 12. Next, at block 86 a do loop is entered for each block$_i$ of the lost file(s) as follows. It is determined at decision diamond 88 whether the requested version of the block of the file (ordinarily the latest version) is on the local back up disks. If so, the block is preferentially restored from the local back up disks at block 90. Otherwise, it is restored via the modems 26, 16 from the data center 12 at block 92. From block 90 or block 92, the logic loops back to retrieve the next block$_i$, and continues this process until the entire requested files have been restored.

While the particular SYSTEM AND METHOD FOR BACKING UP COMPUTER FILES OVER A WIDE AREA COMPUTER NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A system for backing up files in user computers, comprising:

a data center;

a plurality of user computers remote from the data center and in communication with the data center;

subfile incremental back up logic means associated with each user computer for determining changed blocks that have been changed since a predetermined back up time and generating changed block signals in response thereto;

chunk transmission logic means responsive to the subfile incremental logic means for sending only changed blocks to the data center in chunks having a predetermined size;

synchronizing logic means responsive to the changed block signals for synchronizing the subfile incremental logic means; and logic means for generating a listing of the blocks of the files stored at the data center and, associated with each block, the first two characters of the block and a digital signature of the block, and the subfile incremental logic means uses the listing to undertake the determining function.

2. The system of claim 1, wherein the synchronizing logic means uses the listing to undertake the synchronizing function.

3. The system of claim 2, further comprising:

logic means for periodically copying remote versions at the data center onto a portable data storage medium; and logic means for restoring local files by copying remote versions from the portable data storage medium when the remote versions stored on the portable data storage medium are at least as current as the remote versions stored at the data center, and otherwise restoring local files by copying remote versions from the data center.

* * * * *